United States Patent [19]

Boyle et al.

[11] Patent Number: 4,630,833
[45] Date of Patent: Dec. 23, 1986

[54] MOLDED RING SEAL WITH END SUPPORT RINGS

[75] Inventors: William G. Boyle, Dallas; Ernest P. Fisher, Jr., Carrollton, both of Tex.

[73] Assignee: Otis Engineering Corporation, Dallas, Tex.

[21] Appl. No.: 648,084

[22] Filed: Sep. 7, 1984

Related U.S. Application Data

[62] Division of Ser. No. 459,058, Jan. 19, 1983, Pat. No. 4,483,543.

[51] Int. Cl.[4] .............................................. F16J 15/12
[52] U.S. Cl. .................... 277/188 A; 277/198; 277/228; 277/235 R
[58] Field of Search ........... 277/188 R, 188 A, 235 R, 277/165, 228, 198, 227

[56] References Cited

U.S. PATENT DOCUMENTS

| 368,189 | 8/1887 | Carter | 277/198 |
|---|---|---|---|
| 2,249,155 | 7/1941 | Meddick | 277/188 R |
| 2,736,585 | 2/1956 | Riesing | 277/153 |
| 3,186,042 | 6/1965 | Daley | 277/235 |
| 3,531,133 | 9/1970 | Sheesley et al. | 277/235 |
| 3,532,350 | 10/1970 | Kaufman | 277/235 |

Primary Examiner—Robert S. Ward
Attorney, Agent, or Firm—Roland O. Cox

[57] ABSTRACT

A molded resilient ring seal with support rings mold bonded or bonded and connected to both ends. The molded resilient material portion of the seal utilizes unique contouring to reduce internal resilient material stresses during use, enabling the seal to seal higher pressures at elevated temperatures for longer periods of time. A number of support ring configurations are also disclosed, which further enhance sealing ability of the resilient material.

32 Claims, 8 Drawing Figures

MOLDED RING SEAL WITH END SUPPORT RINGS

This application is a division of co-pending U.S. application Ser. No. 459,058, filed Jan. 19, 1983, now U.S. Pat. No. 4,483,543.

FIELD OF THE INVENTION

This invention relates to ring seals and in particular to resilient ring seals with supporting and clearance closing end rings.

DESCRIPTION OF THE PRIOR ART

Molded seal elements such as those shown on page 26 of "Production Packer Equipment and Services", catalog publication OEC 5120D of Otis Engineering Corporation, P. 0. Box 819052, Dallas, Texas 75381-9052, have been successfully used to sealingly engage and maintain pressure seals between well tools and well tools and tubing or casing used in earth wells.

Seals of the type shown in U.S. Pat. No. 4,109,716 to Carlos R. Canalizo entitled "SEAL" have been used to effectively seal tools at desired depths inside well tubulars. Another example of a similar seal is shown in U.S. Pat. No. 4,305,595 to Miyagishima and Carbaugh.

The aforementioned seals are of the diametral "interference" type. A diametral interference type seal is typified by the inside diameter of the seal being smaller than the tool mandrel outside diameter over which it is installed and the expanded outside diameter of the seal being greater than the inside diameter of the seal bore into which the seal is inserted and radially compressed to sealingly engage.

Pressure differential sealing ability of interference seals is dependent on many factors including strength of the resilient material in compression, in tension, and in shear and percent loss of those strengths because of elevated temperatures and chemical attack in earth wells, the amount of resilient material interference and the amount of clearance between tool outside diameter or seal supporting end ring outside diameters and the inside diameter of the bore engaged by the seal.

The aforementioned seal elements typically utilize a great amount of diametral interference. Supporting rings of harder, stronger material are usually connected to the resilient seal material by bonding during the resilient material molding process. The large amount of interference and bonded supporting rings are required to withstand high temperatures and pressures encountered in modern deeper earth wells. One result of this large amount of interference is that a large longitudinal force is required to radially expand the resilient seal material when installing over a tool mandrel and to radially compress the resilient material to insert into a bore for sealing engagement. Forced insertion and resulting stress concentrations at support ring corners frequently tear the support ring bonds. Shear stresses induced into the resilient material also contribute to permanent damage to the seal. As increasing pressure differentials are placed on the engaged seal, connecting bonds may be partially or completely destroyed, and the resilient material is forced into any clearance between end support rings and seal bores inducing shear, tensile and/or compressive stresses into the material at the seal material/support ring interface. Excessively high pressures can cause extrusion of the resilient material through very small clearances resulting in complete seal failure.

SUMMARY OF THE INVENTION

The molded seal configuration of the present invention utilizes generously radiused convex internal and external resilient material contours bonded at both ends to support rings which provide stronger resilient material to support ring connections and reduce internal resilient material stresses and extrusion when the seal is in use. Tests of this seal configuration reveal that much lower insertion forces are required for a given amount of diametral interference. When using wireline methods for installing tools in tubing seal bores, great forces for radial seal compression and insertion are not available. These seals are not easily damaged by insertion and high pressures, as the radiused resilient material and support rings effectively reduce or eliminate inducement of excessive compressive and shear stresses into the resilient material and ring to seal bonds remain intact much longer.

As elevated temperatures encountered in today's deep earth wells cause softening of resilient materials used for molded seals, high pressures present may tear resilient material support ring bonds and cause extrusion of softened seal materials through very small support ring-seal bore clearances, resulting in seal failure. Configurations of the present invention seal utilize the uniquely contoured resilient material with pressure deformable support ring configurations which provide resilient material to support ring connection after bond tear or failure, and reduce or eliminate clearance between support ring outside diameters and seal bore inside diameters to enhance seal pressure holding capabilities.

An object of this invention is to provide a seal ring requiring less force to install on a seal mandrel and to insert into a seal bore.

Another object of this invention is to provide a seal ring wherein resilient material stresses induced by sealing great pressure differentials are greatly minimized.

Another object of this invention is to provide a seal ring configuration which prevents excessive resilient seal material stress concentrations around end support rings.

An object of this invention is to provide seal support ring configurations which enhance sealing ability by remaining connected to the resilient material after resilient material support ring mold bonds partially or totally fail.

Also, an object of this invention is to provide seal support rings which further enhance the sealing ability of the resilient material configuration by reducing or closing the clearances sealed.

Also, another object of this invention is to provide support rings for a resilient seal which both reduce sealed clearances and are mechanically connected to the resilient material.

DESCRIPTION OF THE PREFERRED EMBODIMENTS

Figure 1:
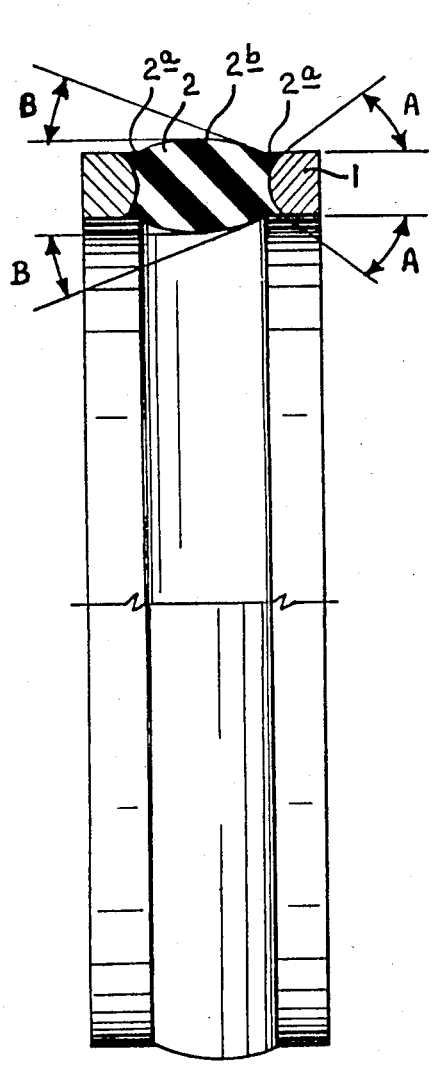
FIG. 1 is a half-sectioned elevational view of the seal of this invention with radiused end support rings.

FIG. 1 shows the basic molded resilient seal configuration of this invention wherein radiused one end support rings 1 are connected to both ends of a resilient moldable material portion 2, which is formed and connected by bonding to the support rings during the molding process. Typical of the resilient material portion 2 are a middle section 2b, which is curved convexly on the outside and inside surfaces, and cylindrical sections 2a formed on both ends of section 2b. The centers and magnitudes of radii forming the outside and inside of section 2b are selected by design calculation to intersect the cylindrical sections 2a outside and inside near the support rings for minimum cross-section compression and ease of installing the seal over a mandrel or into a seal bore. Sufficient resilient material and space for material movement is provided without the material being compressed between support rings and seal bore, and possibly cut. High pressure differentials are sealingly retained without high shear and compressive stresses in the resilient material near the support rings. For this purpose, angles B in FIG. 1 should be preferably 5–30 degrees and less than 40 degrees resulting in lower over mandrel installation and seal bore entry forces as angles B decrease during installation and insertion in a seal bore.

Resilient material compressive and shear stresses are minimized, when sealing high differential pressures, by the large radius support rings which also provide greater surface areas for enhanced connecting bonds of resilient material to support rings. Angles A, FIG. 1, have been determined to be preferably 30–35 degrees, within a workable range of 15–75 degrees.

Figure 2:
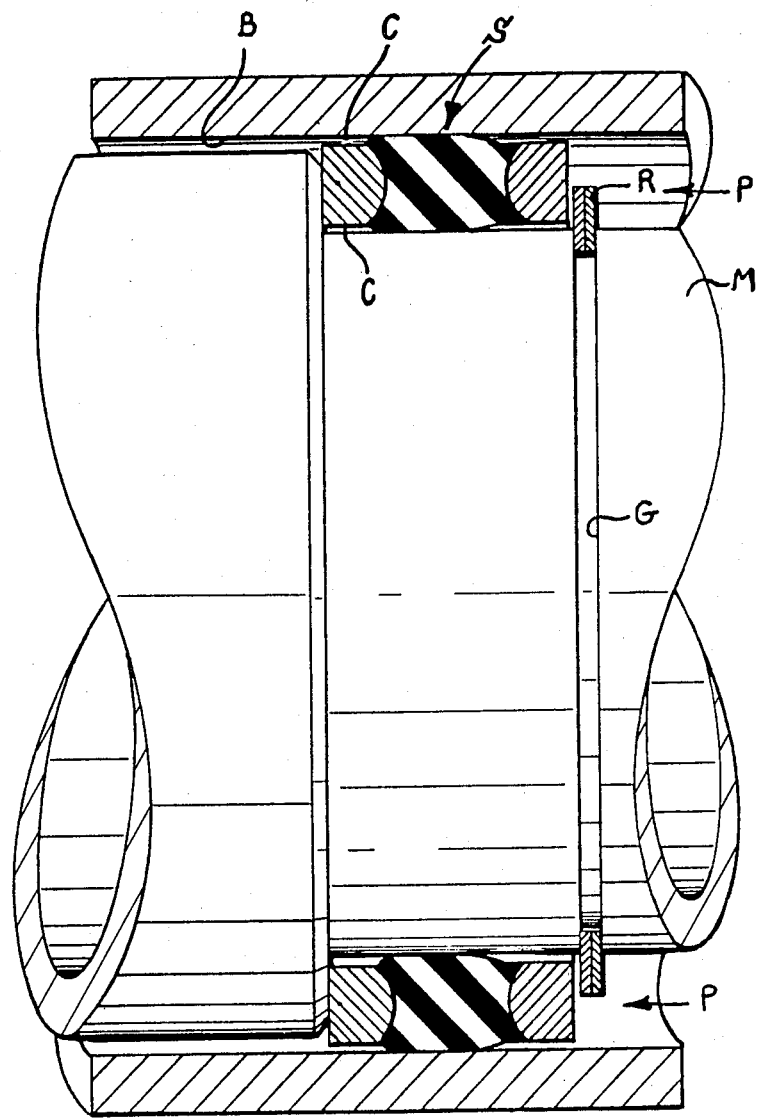
FIG. 2 is a view in elevation of the seal of FIG. 1 on a tool mandrel inserted into and sealingly engaging a seal bore.

FIG. 2 shows the seal of FIG. 1 installed over tool mandrel M and retained in sealing engagement on the tool mandrel smooth turned outside diameter by retaining ring R engaged in groove G. The tool mandrel with seal S has been inserted into and sealingly engages seal bore B, and pressure differential P-force has moved the molded resilient material toward the support ring-seal bore and turn clearances C.

During rigorous tests of the seal configuration of FIG. 1, under extremely high pressures and temperatures, frequent and rapid pressure reversals eventually tore the support ring resilient material bonds partially or completely. The support ring configurations of FIGS. 3–8 were developed to prevent extrusion and bond tears and furnish better support for the resilient material portion of the seal ring.

Figure 3:
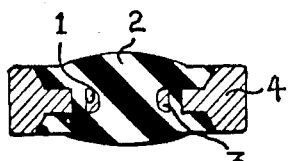
FIG. 3 is a cross-sectional view of the seal of this invention with connected support rings.

FIG. 3 shows the molded seal portion 2 of FIG. 1 with support rings of a cross-section which remain connected to the resilient material even though the mold formed connecting bond between support ring and resilient material partially or totally fails. This additional molded connection has been found to increase the longevity and/or the pressure holding capability of seals not having connected support rings. A number of openings 1 are formed in a tongue portion 3 of the support rings 4. During the molding process, resilient material bonds to the support rings and bonds to itself through the openings, providing the additional mechanical connection.

Figure 4:
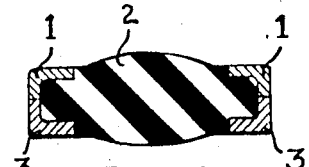
FIG. 4 is a view in cross-section of the seal of this invention with deformable two-piece support rings.

FIG. 4 shows the seal portion 2 of FIG. 1 to which four "L" cross-section concentric support rings 1 and 3 form an inward facing "U" cross-section and are bonded at each end to the resilient material during molding. As differential pressure thrust moves and compresses sealingly engaged resilient seal material, the deformable supports away from high pressure are deformed and spread by the compressed resilient material within, to close clearances sealed and increase the pressure holding ability of the seal.

Figure 5:
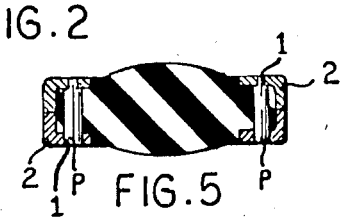
FIG. 5 is also a cross-sectional view of the seal of this invention with deformable connected support rings.

FIG. 5 shows the bonded seal material and support rings of FIG. 4 wherein a number of pins P, having shoulders on one end, have been installed from inside through holes or openings 1 in "U" section support rings (pair of 2's) to keep the pins from falling out. The resilient material is molded around and bonded to the pins to provide a mechanical connection after bond failure.

Figure 6:
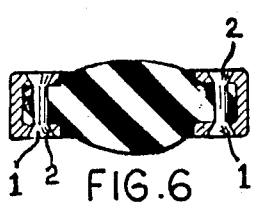
FIG. 6 is a cross-sectional view of the seal of this invention with connected one-piece support rings.

FIG. 6 shows one-piece "U" cross-section end support rings mechanically connected and bonded to the molded material configuration of FIG. 1, by molding around pins 1 bradded in support ring openings 2.

Figure 7:
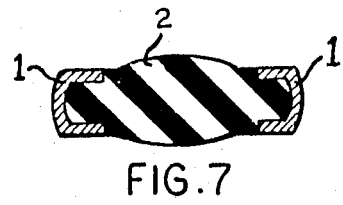
FIG. 7 is another cross-sectional view of the invention seal with deformable support rings.

FIG. 7 shows deformable one-piece "U" section support rings 1 bonded to the molded seal portion 2 of FIG. 1. The support rings of FIG. 7 (like those of FIG. 4) may be deformed by compressive forces induced in the resilient seal material by differential pressure thrust and spread to reduce support ring-seal bore clearances and increase differential pressures held by the seal. If deforming forces become great enough, the deformable support rings may be moved outwardly and inwardly far enough to contact the outside of the seal mandrel and inside of the seal bore and close clearances into which the resilient material may be forced or possibly extruded through, increasing to a maximum pressure holding capabilities of the seal. If deforming force induced stresses exceed the support ring material elastic limit, the support rings will be permanently deformed and will not return to their original shape when the deforming force is reduced.

Figure 8:
FIG. 8 is a cross-sectional view of the seal of this invention with connected deformable support rings.

FIG. 8 shows the seal of FIG. 7 wherein the deformable support rings have been rolled or crimped inwardly before molding, to remain connected to the molded resilient material portion after the support ring-resilient material bond has been partially or totally destroyed.

We claim:

1. A seal ring comprising end support rings having the same diameters, each support ring having a substantially flat outer end and inner end surfaces with openings therein, one support ring connected to each end of an elongate generally cylindrical resilient material portion by forming said material in said openings and said portion in a mold, said resilient material portion having a cylindrical end section, a middle contoured ring section and another cylindrical end section wherein the outside of said contoured ring section curves radially outward from the outside of one of said cylindrical end sections to a larger diameter and curves radially inward from said larger diameter to the outside of the other end section, and the inside of said contoured section curves radially inward from the inside of one of said cylindrical end sections to a smaller diameter and curves radially outward from said smaller diameter to the inside of the other cylindrical end section, and said inward and outward curves are blending radii tangent to lines forming angles of 5 to 30 degrees, preferably 15 degrees, with the outside and inside surfaces of said cylindrical end sections.

2. The seal ring of claim 1 wherein the resilient material portion is formed and bonded to the end support rings in a mold.

3. The seal ring of claim 2 wherein the end support rings are a ferrous alloy.

4. The seal ring of claim 2 wherein the end support rings are a nickle alloy.

5. The seal ring of claim 2 wherein the support rings are titanium alloy.

6. The seal ring of claim 1 wherein each support ring is L-shaped in cross-section and are arranged concentrically in pairs to form inwardly facing generally U-shapes in cross-section.

7. The seal ring of claim 6 wherein the resilient material portion is formed and bonded to the end support rings in a mold.

8. The seal ring of claim 7 wherein the end support rings are a ferrous alloy.

9. The seal ring of claim 7 wherein the end support rings are a nickle alloy.

10. The seal ring of claim 7 wherein the support rings are titanium alloy.

11. The seal ring of claim 6 wherein each "U" section support ring further includes openings through each "U" ring wall, each pair of said openings having a pin disposed therein.

12. The seal ring of claim 11 wherein the resilient material portion is formed and bonded to the end support rings in a mold.

13. The seal ring of claim 12 wherein the end support rings are a ferrous alloy.

14. The seal ring of claim 12 wherein the end support rings are a nickle alloy.

15. The seal ring of claim 12 wherein the support rings are titanium alloy.

16. The seal ring of claim 1 wherein each end support ring is one-piece, "U" shaped in cross-section and positioned inwardly facing on each resilient material portion end.

17. The seal ring of claim 16 wherein the resilient material portion is formed and bonded to the end support rings in a mold.

18. The seal ring of claim 16 wherein the "U" support rings further include openings through each "U" ring wall, each pair of openings having a pin disposed therein, each end of each of said pins being fastened in said openings.

19. The seal ring of claim 17 wherein said end support rings are a ferrous alloy.

20. The seal ring of claim 17 wherein said end support rings are a nickle alloy.

21. The seal ring of claim 17 wherein said support rings are titanium alloy.

22. The seal ring of claim 16 wherein each said "U" section support ring wall has been deformed inwardly toward the other wall on the inner end of each support ring.

23. The seal ring of claim 22 wherein the resilient material portion is formed and bonded to the end support rings in a mold.

24. A seal ring comprising end support rings having the same diameters and an elongate generally cylindrical resilient material portion, each support ring having a substantially flat outer end and an inner end surface with openings therein, a support ring being mechanically connected to each end of said resilient material portion by forming said resilient material in said inner end surface openings.

25. The seal ring of claim 1 wherein each support ring has an inner tongue portion with openings therethrough.

26. The seal ring of claim 18 wherein the resilient material portion is formed and bonded to the end support rings in a mold.

27. The seal ring of claim 26 wherein the end support rings are a ferrous alloy.

28. The seal ring of claim 26 wherein the end support rings are a nickle alloy.

29. The seal ring of claim 26 wherein the end support rings are a titanium alloy.

30. The seal ring of claim 23 wherein the end support rings are a ferrous alloy.

31. The seal ring of claim 23 wherein the end support rings are a nickle alloy.

32. The seal ring of claim 23 wherein the end support rings are a titanium alloy.

* * * * *